Oct. 29, 1957 M. W. SLATE 2,811,698

ULTRA HIGH FREQUENCY TUNING DEVICE

Filed Dec. 24, 1954

INVENTOR.
MATTHEW W. SLATE

BY Darby & Darby

ATTORNEYS

United States Patent Office 2,811,698

Patented Oct. 29, 1957

2,811,698

ULTRA HIGH FREQUENCY TUNING DEVICE

Matthew W. Slate, New York, N. Y., assignor to Allen B. Du Mont Laboratories, Inc., Clifton, N. J., a corporation of Delaware Application December 24, 1954, Serial No. 477,475

4 Claims. (Cl. 333—82)

This invention relates to a tuning device for ultra high frequency circuits.

One object of this invention is to provide a particular form of ultra high frequency tuning device by means of which an extended tuning range can be obtained.

Another object of this invention is to provide a tuning device of the type employing a transmission line forming elements of the circuit to be tuned, and a complex shading unit having inductive and capacitive portions successively effective to effect tuning of the connected circuit both by capacitive and inductive shading effects.

Another object of the invention is to provide a device of this type in which an extension of the tuning range at both the upper and lower frequency ends can be effected.

The invention is shown herein as applied to a series tuned circuit, but those skilled in the art will appreciate that it may be applied to parallel tuned or other involved circuits.

Other and more detailed objects of the invention will be apparent from the following disclosure of the embodiment thereof, illustrated in the attached drawings.

In those drawings—

Figure 1:
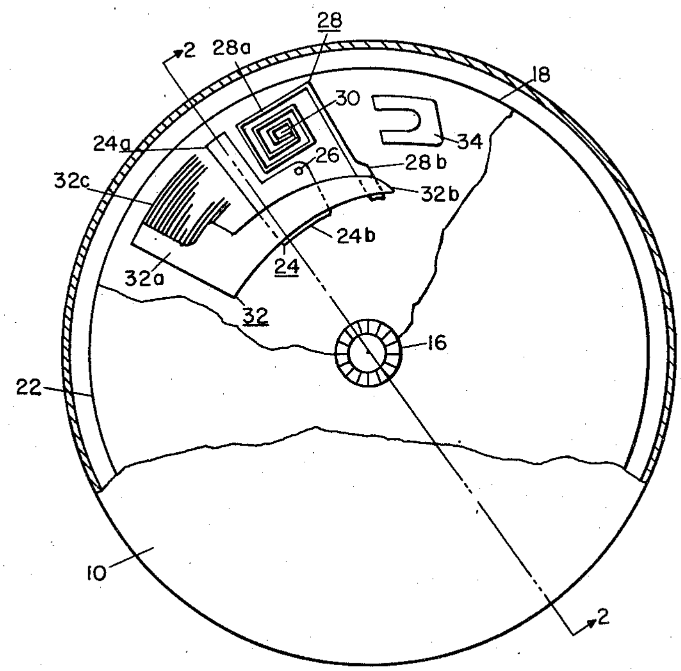
Figure 1 is a top plan view of a tuning device in accordance with this invention with some parts broken away to show the relationship of the transmission line elements and the shading element unit.
Figure 2:
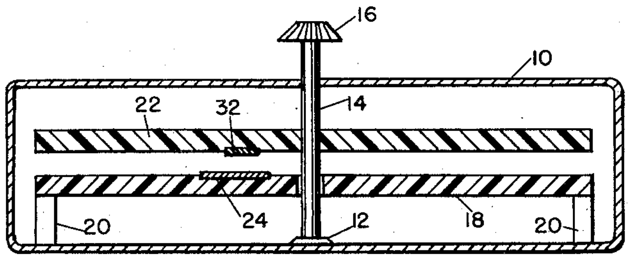
Figure 2 is a cross-sectional view taken on the line 2—2 of Figure 1.

The subject matter of this application is related to that of the copending application of David C. Felt, Serial No. 314,851, filed October 15, 1952, my co-pending continuation-in-part application Serial No. 477,473, filed December 24, 1954, my co-pending application Serial No. 477,474 filed December 24, 1954, now Pat. No. 2,794,922, my co-pending application Serial No. 477,476, filed December 24, 1954, and my co-pending application Serial No. 477,521, filed December 24, 1954, all assigned to the assignee of the instant application.

As illustrated, the device includes a housing 10 of suitable form and constructed of materials suited to the purposes of this invention. Within the housing is a bearing 12 for the lower end of an operating shaft 14, the upper end of which extends exteriorly of the housing, opposite bearing 12, and is provided with a knob 16 on the protruding end. Within the housing is an insulative support 18 illustrated in the form of a disk mounted on supports 20 in the housing. Secured to the shaft 14, so as to lie closely parallel to the disk 18, is a second insulative support 22, likewise shown as a disk.

Shaft 14 effects relative rotation of disk 22 with respect to disk 18. Thus the transmission line elements and shading element unit are arranged for relative movement on an arcuate path but, as disclosed in one or more of the above applications, the relative movement may be rectilinear and the insulative supports can take many other configurations.

Mounted on the disk 18 are the transmission line conductors 24 and 28. The conductor 24 is substantially L-shaped, having a radial arm 24*a* and a circumferential area 24*b*. This conductor is provided with a circuit terminal 26, which, for example, may be in the form of a contact when desired for use in connection with band switching mechanism or in printed circuitry. Conductor 28 comprises an inductive, multiturn portion 28*a*, having a terminal connection 30 on its inner end and a radially conductive area 28*b* spaced from and parallel to the end 24*b* of the conductor 24.

The shading element unit 32 comprises an elongated arcuate portion 32*b*, a radial portion 32*a*, and a series of laterally extending arcuate conductive strands or fingers 32*c*. These fingers are in the form of very fine filaments of metal and as illustrated, may be of varying lengths. It will be noted that these fingers are on an arcuate path of movement with respect to the radial arm 24*a* of the transmission line element 24 and of the inductive portion 28*a* of the transmission line element 28. The shading element unit 32 is mounted on the insulative support 22, as is an additional shading element unit 34. Shading element 34 lies on an arcuate path so that it too may be moved over the inductive portion 28*a* of transmission line 28.

The transmission line elements and the associated shading element units can be made and attached to their respective supports in any suitable manner, but are particularly adapted for application by printed circuit techniques.

In Figure 1 the insulative support 22 is shown in a position so that the shading element units are approximately in, what may be termed a "mid-band" position. Rotation from this position in clockwise direction effects tuning on the low end of the band, while counterclockwise rotation from this position effects tuning on the high end of the band.

As will be appreciated, in normal use the circuit connection to transmission line 24 is at contact 26. It is recommended that contact 26 be the grounded side of the associated circuit with the hot side being connected to the other end of transmission line 24 at contact 30. The areas of the portions 24*a* and 24*b* are primarily capacitive areas, while the portion 28*a* is an inductive area and the area 28*b* is a capacitive area.

Of the shading element unit section 32, the area 32*b* is a capacitive area which upon rotation varies the capacitance between the circuit element areas 24*b* and 28*b*. The portion 32*b* of the shading element can be given other configurations and sizes to meet particular tuning problems.

In order to extend the low frequency end of the tuning range, the fine conductive fingers 32*c* are provided to cooperate with the inductance 28*a*, establishing a capacitive connection between 28*a* and 24*a* without materially reducing the value of the inductance. In order to extend the high frequency end of the tuning range, the additional shading element 34 can be moved to shade the inductance 28*a*, decreasing its value without materially affecting the capacitance to other portions of the circuit.

Those skilled in the art will understand from the above that the various shapes and sizes of the working parts can be modified to meet particular frequency characteristics. The particular formation illustrated herein, therefore, is provided to indicate the nature of the invention, but as to the scope thereof it is preferred that its limits be bound in the appended claims.

I claim:

1. In an ultra high frequency tuning device, a transmission line comprising a pair of conductors supported in a plane, one of said conductors comprising two capacitive areas having a pair of sides defining an angle, a circuit connection for said conductor, the other of said conductors having an inductive portion lying in said angle and a capacitive portion spaced close to one of said areas, a circuit connection to said inductive portion, and a relatively movable shading element unit lying in another plane parallel to said first plane, comprising a generally L-shaped conductive member positioned so that one arm thereof moves over one of the capacitive areas of said first conductor and the capacitive area of said second conductor and the other arm thereof moves over the other capacitive area of said first conductor and the inductive portion of said second conductor.

2. In the combination of claim 1, said other arm having a plurality of fine conductive fingers extending laterally thereof in the direction of relative movement.

3. In the combination of claim 1, said shading element unit including another conductive area positioned to move over said inductive portion.

4. In the combination of claim 1, said other arm having a plurality of fine conductive fingers extending laterally thereof in the direction of relative movement and another conductor positioned to move over said inductive portion.

References Cited in the file of this patent

UNITED STATES PATENTS

| | | |
|---|---|---|
| 1,597,591 | Freese | Aug. 24, 1926 |
| 2,578,429 | Karplus | Dec. 11, 1951 |
| 2,715,211 | Murakami | Aug. 9, 1955 |